Patented May 2, 1933

1,906,962

UNITED STATES PATENT OFFICE

HERMANN HECKEL, OF CINCINNATI, OHIO, ASSIGNOR TO THE TWITCHELL PROCESS COMPANY, OF ST. BERNARD, OHIO, A CORPORATION OF OHIO

EMULSIFIED INK AND PAINT

No Drawing.   Application filed February 12, 1930.   Serial No. 427,949.

This invention relates to inks, paints, varnishes, lacquers, enamels, and the like, characterized by a two phase structure. The outer phase comprises an organic vehicle, a pigment, and a dispersing agent, the latter accomplishing a remarkably thorough and complete dissemination of the pigment throughout the vehicle far greater than would result from the mere grinding the pigment in the vehicle. The inner phase comprises water which is stabilized and held in emulsified condition by the same dispersing agent which is responsible for the thorough dispersion of the pigment throughout the vehicle. The preferred dispersing and emulsifying agent is mahogany sulphonates.

These bodies will both induce and stabilize an emulsion of the water in oil type and will perform the additional function of dispersing a pigment throughout the oil phase. Still otherwise expressed, the inks, paints, lacquers, varnishes and the like of this invention comprise an oily organic vehicle (either with or without binders or gums), a pigment, water, and mahogany sulphonates.

The advantages of inks and paints of this type are manifold, among them being that the viscosity or shortness of the body can be controlled by the amount of water added, the greater the amount of water (up to a certain limit), the greater being the viscosity and shortness, and that this addition of water does not in any way alter or vary the general coloring power of the body. Therefore, it is possible to use water as a filler instead of using some other organic or inorganic filler or reducing agents, the water acting to decrease the viscosity or lessen the flow. This is very desirable, for instance, for a silk screen paint which has to go through a relatively fine mesh. The water does not clog the screen as would a solid filler, yet its use permits accurate control of the tendency of the paint to flow or bleed upon the material being painted.

Moreover, this shortness which is gained by the addition of water as an emulsified inner phase, produces an ink of body very appropriate for use in steel die engraving, said ink being characterized by the fact that it lifts out of the die with great facility and uniformity. Moreover, an ink of this type does not dry upon the die or type as quickly as the conventional water inks. On the other hand, these emulsified inks above described dry upon the paper when printed much more quickly than the conventional oil varnishes customarily used for steel die engraving.

The use of the mahogany sulphonates in these two phase inks and paints is particularly desirable for the reason that the mahogany sulphonates not only accomplish and stabilize the emulsification, but that they perform the second and perhaps even more valuable function of improving the dispersion of the pigment in the outer or organic phase, thereby producing an ink or paint of readily controllable flow and shortness which is at the same time a workable ink of great coloring power in proportion to the amount of solid material employed and in proportion to its physical weight.

The mineral oil sulphonates are derived from the process of producing medicinal white oils and the light colored technical oils by treating a mineral oil with strong and/or fuming sulphuric acid and/or sulphur trioxide. As a result of this treatment two layers are formed, the upper layer known as the A layer or oil layer, and the lower layer known as the B layer or sludge layer. The sulphonates of the A layer are highly oil soluble and the sulphonates of the B layer are highly water soluble. The oil soluble sulphonates are known as mahogany sulphonates and are usually recovered from the oil layer by treating it with an aqueous alcoholic solvent. The sulphonates so recovered contain as a rule considerable entrained oil and may be further purified by distillation or by further extractions with higher proof alcoholic solvents. The sulphonates so treated to eliminate substantially all of the entrained oil or mother oil are called true mahogany.

If the mahogany sulphonates with the mother oil present be treated with a high proof alcoholic solvent, two layers are formed, one layer containing alcohol and sulphonates, the other layer, oil and sulphonates. The sulphonates in the oil layer are more highly oil soluble than those in the alcohol layer and if they be separated from the entrained oil or mother oil, they are particularly excellent dispersing agents and particularly conducive to water in oil emulsions.

These mahogany sulphonates can be used either as mahogany acids or as salts of the mahogany acids. Generally speaking, between 1 and 10% true mahogany sulphonates are desirable for accomplishing the desired results. The following examples provide definite description of some of my inks and paints, but I desire to be limited only by the claims.

*Example 1*

2 kilograms of ester gum is dissolved in an equal weight of V. M. and P. naphtha. 200 grams of true mahogany sodium sulphonates is dissolved therein after which 2 kilograms of water is dispersed in the resulting varnish. The water is added slowly to the varnish with vigorous agitation. The emulsion so prepared is transferred to a ball mill and the desired pigments are then added. For the preparation of a yellow paint or ink, 2 kilograms of cholesterol and 200 grams magnesia are ground in the above described base. In the preparation of a black paint or ink, the above yellow is replaced with 160 grams of a high grade carbon black and 400 grams magnesia. In the preparation of a red paint or ink, 1000 grams of fire red is ground into the base. These inks are suitable for use for steel die engraving or for wall paper inks.

*Example 2*

1750 grams of fire red is ground in 3675 grams varnish which is constituted of 1750 grams ester gum, 1750 grams V. M. and P. naphtha and 175 grams true mahogany sodium sulphonates. This grinding is best accomplished in the usual type paint mill.

3500 grams water is then dispersed in the paste. The dispersion is accomplished by slowly adding the water to the paste under vigorous agitation. For this purpose, a double action stir as used in the preparation of mayonnaise emulsions is recommended. These inks are suitable for use for steel die engraving or for wall paper inks.

*Example 3*

1350 grams ultra marine blue is ground in 1000 grams varnish of the same composition as in the previous example. 1000 grams water is then incorporated in the resulting paste as above. These inks are suitable for use for steel die engraving or for wall paper inks.

*Example 4*

200 grams fire red is ground in 500 grams commercial varnish containing 45 to 50% V. M. and P. naphtha, the remainder consisting of drying oils, varnish gums and driers and in which has been dissolved 25 grams true mahogany sodium sulphonates.

500 grams water is then dispersed in the paste. These inks are suitable for use for steel die engraving or for wall paper inks. This composition in addition to being adaptable as a steel die ink and wall paper ink may be used as a silk screen paint.

It is to be observed that a gum or binder can be used and preferably is used in the organic phase. The mahogany sulphonates can be incorporated in the ink or paint either by admixing them with the water or admixing them with the organic phase. It is preferable either that they be mixed with the organic phase in producing the vehicle prior to grinding, or that the pigments be ground in the organic phase in the presence of the mahogany sulphonates prior to the addition of the water for the reason that the presence of the mahogany sulphonates facilitates grinding and dispersion.

Having described my invention, I desire to be limited only by the ensuing claims:

1. A liquid coating, comprising, an outer organic phase, an inner aqueous phase, a pigment, and mahogany sulphonates as a pigment dispersing and water emulsifying agent.

2. A liquid coating, comprising, an outer organic phase, an inner aqueous phase, a pigment, and true mahogany sulphonates as a pigment dispersing and water emulsifying agent.

3. A liquid coating, comprising, an outer organic phase, an inner aqueous phase, a pigment, an oil soluble binder, and mahogany sulphonates as a pigment dispersing and water emulsifying agent.

4. A liquid coating, comprising, an outer organic phase, an inner aqueous phase, a pigment, an oil soluble binder, and true mahogany sulphonates as a pigment dispersing and water emulsifying agent.

5. The method of increasing the shortness of liquid coatings, comprising, a pigment and organic binder, said method, comprising, admixing both mahogany sulphonates and water with said pigment and organic binder.

6. The method of increasing the shortness of liquid coatings, comprising, a pigment and organic binder, said method, comprising, admixing both true mahogany sulphonates and water with said pigment and organic binder.

7. The method of increasing the shortness of liquid coatings, said method, comprising, forming a base of organic varnish, mahogany sulphonates, and pigment and then adding water to said admixture until the desired shortness is developed.

8. A printing ink, comprising, a volatile hydrocarbon adapted to evaporate when said ink is deposited upon the paper being printed, water, mahogany sulphonates, a binding agent, and a pigment.

9. A vehicle for liquid coating compositions, comprising, an organic outer phase containing substances adapted upon grinding to form said coating, an inner aqueous phase, and mahogany sulphonates as an emulsifying agent.

In witness whereof, I hereunto subscribe my name.

HERMANN HECKEL.